US008301936B2

(12) United States Patent
Inoue et al.

(10) Patent No.: US 8,301,936 B2
(45) Date of Patent: Oct. 30, 2012

(54) APPARATUS AND METHOD FOR PERFORMING A SCREENING TEST OF SEMICONDUCTOR INTEGRATED CIRCUITS

(75) Inventors: Hiroaki Inoue, Tokyo (JP); Masamichi Takagi, Tokyo (JP); Masayuki Mizuno, Tokyo (JP)

(73) Assignee: NEC Corporation, Tokyo (JP)

( * ) Notice: Subject to any disclaimer, the term of this patent is extended or adjusted under 35 U.S.C. 154(b) by 243 days.

(21) Appl. No.: 12/447,524

(22) PCT Filed: Oct. 17, 2007

(86) PCT No.: PCT/JP2007/070255
§ 371 (c)(1),
(2), (4) Date: Apr. 28, 2009

(87) PCT Pub. No.: WO2008/053709
PCT Pub. Date: May 8, 2008

(65) Prior Publication Data
US 2010/0077259 A1    Mar. 25, 2010

(30) Foreign Application Priority Data

Nov. 2, 2006   (JP) .................................. 2006-299091

(51) Int. Cl.
*G06F 11/00* (2006.01)
(52) U.S. Cl. ......................................................... 714/30
(58) Field of Classification Search .................... 714/10, 714/11, 30
See application file for complete search history.

(56) References Cited

U.S. PATENT DOCUMENTS

| | | | | |
|---|---|---|---|---|
| 4,181,940 A * | 1/1980 | Underwood et al. ............ | 714/25 |
| 5,127,092 A * | 6/1992 | Gupta et al. ................... | 712/234 |
| 5,384,906 A * | 1/1995 | Horst ............................. | 713/375 |
| 5,513,338 A * | 4/1996 | Alexander et al. .............. | 703/28 |
| 5,732,209 A * | 3/1998 | Vigil et al. ....................... | 714/30 |
| 5,845,060 A * | 12/1998 | Vrba et al. ....................... | 714/12 |
| 5,905,855 A * | 5/1999 | Klaiber et al. ................... | 714/31 |
| 6,145,087 A * | 11/2000 | Ishihara ......................... | 713/500 |
| 6,463,551 B1 * | 10/2002 | Kanzaki et al. ................. | 714/30 |
| 6,633,973 B1 * | 10/2003 | Kanzaki ......................... | 712/227 |
| 6,694,449 B2 * | 2/2004 | Ghameshlu et al. ............ | 714/11 |
| 6,829,728 B2 * | 12/2004 | Cheng et al. .................... | 714/30 |
| 7,185,248 B2 * | 2/2007 | Kondo ........................... | 714/724 |
| 7,739,763 B2 * | 6/2010 | Wang et al. ...................... | 5/710 |

(Continued)

FOREIGN PATENT DOCUMENTS

JP           1994161798 A           6/1994
(Continued)

OTHER PUBLICATIONS

International Search Report for PCT/JP2007/070255 mailed Dec. 4, 2007.

*Primary Examiner* — Amine Riad (57) ABSTRACT

An apparatus for performing a screening test of a semiconductor integrated circuit is disclosed, the semiconductor integrated circuit comprising a plurality of processors each having an output signal for instruction execution information, and the processors being programmatically operable. The apparatus for performing a screening test of a semiconductor integrated circuit comprises: an instruction/data signal synchronization circuit for synchronizing the supplying of instructions to said respective processors and for synchronizing the supplying of data to said respective processors; and a trace comparison circuit for comparing instruction execution information that are output from the respective processors to determine whether or not any of said processors has output different instruction execution information.

19 Claims, 7 Drawing Sheets

U.S. PATENT DOCUMENTS

| | | | |
|---|---|---|---|
| 8,035,429 B2 * | 10/2011 | Kim | 327/144 |
| 2007/0061654 A1 * | 3/2007 | Shimosawa | 714/733 |

FOREIGN PATENT DOCUMENTS

| | | |
|---|---|---|
| JP | 1994208479 A | 7/1994 |
| JP | 1995006049 A | 1/1995 |
| JP | 1996006800 A | 1/1996 |
| JP | 1996235023 A | 9/1996 |
| JP | 2000040069 A | 2/2000 |
| JP | 2003280941 A | 10/2003 |
| JP | 2006153538 A | 6/2006 |
| JP | 2006178814 A | 7/2006 |

* cited by examiner

1 instruction trace=1 packet in principle

Fig.11

| type of instruction | address | data |
|---|---|---|
| conditional non-execution | × | × |
| simple execution | × | × |
| address output execution | ○ | × |
| data output execution | × | ○ |
| address and data output execution | ○ | ○ |
| branching | ○ | × |
| continuation | × | × |
| wait | × | × | kbits  mbits  mbits 1 instruction trace = plural packets

| kbits | mbits |
|---|---|
| type | data/address |
| type | data/address |
| ... | |
| type | data/address |

APPARATUS AND METHOD FOR PERFORMING A SCREENING TEST OF SEMICONDUCTOR INTEGRATED CIRCUITS

TECHNICAL FIELD

The present invention relates to a semiconductor integrated circuit screening test apparatus for concurrently performing a screening test of processors (CPUs) that are provided on a semiconductor integrated circuit.

BACKGROUND OF THE INVENTION

With the development of miniaturization of semiconductors, the degree of integration of semiconductor integrated circuits has been increased. As a result, a semiconductor having thereon a plurality of processors becomes more likely to be realized.

Figure 1:
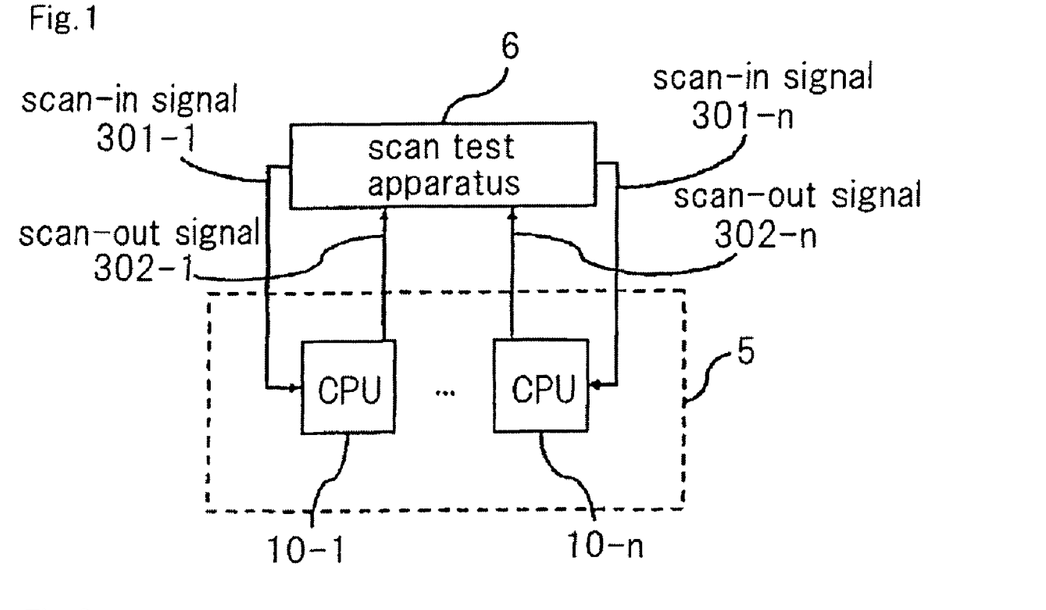
FIG. 1 is a view illustrating an example of the configuration of a conventional system.

FIG. 1 schematically illustrates by way of example a system wherein CPUs which are provided on a semiconductor circuit are concurrently subjected to a screening test performed by a test apparatus outside of the semiconductor circuit. This system has a configuration wherein scan-in signals 300-1 to 300-n are input from scan test apparatus 6 to respective CPUs 10-1 to 10-n that are provided on semiconductor integrated circuit 5, and scan-out signals 302-1 to 302-n are output from respective CPUs 10-1 to 10-n to scan-test apparatus 6.

In this configuration, scan test apparatus 6 sets scan data that are to be used for performing screen testing of flip flop circuits in the CPUs by means of scan-in signals 300-1 to 300-n, and acquires the executed test results by means of scan-out signals 302-1 to 302-n. The executed test results thus acquired are then compared with comparative data that are computed by a simulator etc. If any of the executed test results differ from the comparative data, then semiconductor integrated circuit 5 is discarded.

Thus, scan test apparatus 6 has the capability to concurrently perform a screening test of CPUs.

However, the system shown in FIG. 1 suffers from the following drawbacks. Since the time required to conduct screen testing of a semiconductor integrated circuit is determined by the time needed to set scan data that is to be used for conducting screen testing of flip-flop circuits in a single CPU, the speed of the screening test is very slow. Further, since a scan-in signal and a scan-out signal must be separately connected to the all CPUs, the hardware cost is high.

As a technique to address these problems, a circuit that uses a plurality of CPU cores is described in Patent literature 1. Patent literature 1 discloses a circuit wherein all latches in each CPU core are connected in a scan chain manner, similar to the configuration of the system shown in FIG. 1. Accordingly, Patent literature 1 suffers from the drawbacks similar to those that the system shown in FIG. 1 suffers from.

Figure 2:
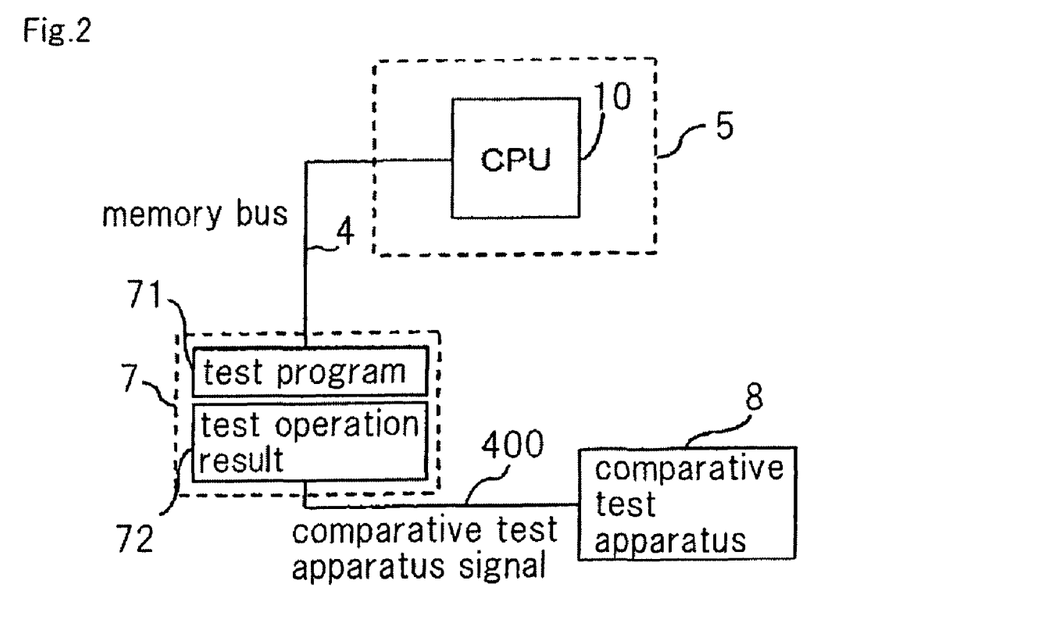
FIG. 2 is a view illustrating another example of the configuration of a conventional system.

FIG. 2 illustrates a typical example of a system in which testing of a single CPU is accelerated. The example shown in FIG. 2 comprises comparative test apparatus 8 for performing a comparative test on CPU 10 in semiconductor integrated circuit 5 utilizing test program 71 and test operation result 72 that are stored in memory 7.

In such a configuration, CPU 10 executes test program 71 through memory bus 4, and loads the execution result into test operation result 72. Comparative test apparatus 8 then acquires test operation result 72 through comparative test apparatus signal 400 and performs a check to determine whether or not the CPU has operated properly.

This allows an extremely high speed test of a single CPU using a real speed operation. As a result, speeding up the screening test of semiconductor integrated circuits having a plurality of CPUs is also achieved.

However, the system shown in FIG. 2 has the following drawbacks.

Since CPU 10 is tested using only test operation result 72 that is stored in memory, the test coverage is very small.

Further, in order to prepare data that can be compared with test operation result 72, a large-scale simulation that covers real speed operations is required, thus making the system very costly.

As a technique to address these problems, Patent literature 2 discloses a method of testing the functions of a CPU, and a method of selecting a test program for the test. Therefore, Patent literature 2 suffers from the problems similar to those that the system shown in FIG. 2 suffers from.

Also, Patent literature 3 discloses a method of comparing output signals from a plurality of CPUs with one another to provide a self-diagnostic capability for a CPU. In this method, signals used for the comparison are CPU internal signals, such as writing data on a bus, address signals that are output from a control circuit, and a computing flag(s) that is/are output from a processor. Accordingly, Patent literature 3 suffers from the problem of an increase in the developing cost required for the reconstruction of the existing CPU because of the comparison of the internal signals. Patent literature 3 also suffers from a decrease in the test coverage because signals to be compared are computation results or memory access information alone, unlike the case in which the internal signals are compared with instruction execution information including the computation results or memory access information.

Patent literature 1: JP2006-153538A
Patent literature 2: JPH8-235023A
Patent literature 3: JPH6-161798A

DISCLOSURE OF THE INVENTION

Problems to be solved by the Invention

As discussed hereinabove, in a screening test of a semiconductor circuit having a plurality of CPUs, there is a trade-off between the increase in the test coverage and the increase in the test speed. Therefore, a screening test that simultaneously satisfies these two requirements was impossible.

Accordingly, it is an object of the present invention to provide an apparatus, a method and a computer program product for conducting screen testing of semiconductor integrated circuits having thereon a plurality of CPUs that can achieve high test coverage while maintaining the high speed of a real speed operation through the use of a computer program.

Means to Solve the Problems

A semiconductor integrated circuit screening test apparatus according to the present invention comprises: instruction/data signal synchronization means for synchronizing the supplying of instructions to the respective processors and for synchronizing the supplying of data to the respective processors; and trace comparison means for comparing instruction execution information that are output from the respective processors to determine whether or not any of said processors has output different instruction execution information.

A method of performing a screening test of semiconductor integrated circuits according to the present invention comprises: upon receipt of all of the instruction read requests from said processors, reading instructions from a memory, and outputting the instructions to the respective processors in synchronization with each other; and comparing instruction execution information that are output from the respective processors to determine whether or not any of the processors has output different instruction execution information.

Another method of performing a screening test of semiconductor integrated circuits according to the present invention comprises: upon receipt of all of the data read requests from the processors, reading data from a memory, and outputting the data to the respective processors in synchronization with each other; and comparing instruction execution information that are output from the respective processors to determine whether or not any of the processors has output different instruction execution information.

The present invention allows a screening test of a semiconductor integrated circuit having thereon a plurality of CPUs to be performed at a high speed through the use of a computer program, and enables higher test coverage through comparison of trace information of instructions.

In addition, comparing trace information of CPUs obviates the necessity to prepare in advance comparative data for the screening test. That is, by utilizing a trace information mechanism that is originally provided for debugging programs that run on a CPU, in the case of conducting a screening test of semiconductor integrated circuits, the test can be performed more inexpensively, at a higher speed and with higher test coverage.

Thus, by testing the inconsistency between items of trace information, it is possible to identify a CPU that has caused an error. The reason for this is largely because the instruction/data synchronization means allows completely synchronous operations between the CPUs, making it possible to compare trace ports to which the operations of the CPUs are output, easily and with higher test coverage, and because utilization of a trace port which is a conventional software debug mechanism in a real operation environment allows a screening test to be performed at high speed.

EXPLANATION OF SYMBOLS 1 semiconductor integrated circuit
2 memory
3 trace test apparatus
4 memory bus
10-1~10-$n$ CPU
11 instruction/data signal synchronization circuit
12 trace comparison circuit
13 instruction synchronization circuit
14 data synchronization circuit
15 trace interpretation circuit
16 trace inconsistency circuit
17 trace compression circuit
21 trace test program
22 trace test data
101-1~101-$n$ CPU instruction signal
102-1~102-$n$ CPU data signal
103-1~103-$n$ trace signal
104 synchronization error signal
200 trace test apparatus signal

BEST MODE FOR CARRYING OUT THE INVENTION

Figure 3:
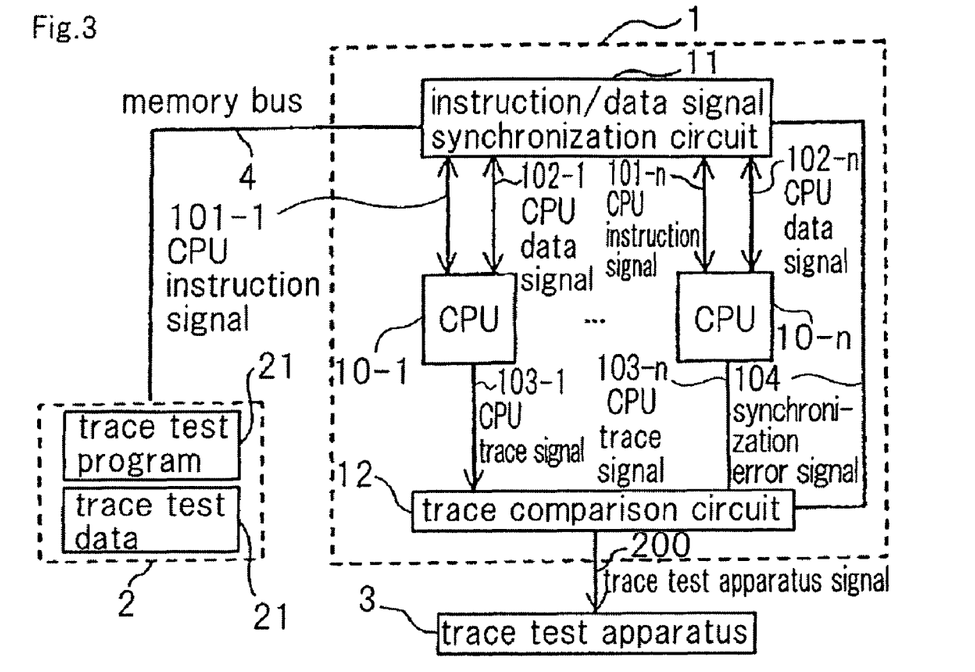
FIG. 3 is a view illustrating the configuration of a semiconductor integrated circuit screening test apparatus according to an exemplary embodiment of the present invention.

FIG. 3 is a view illustrating the configuration of a semiconductor integrated circuit screening test apparatus according to an exemplary embodiment of the present invention. As shown in FIG. 3, the semiconductor integrated circuit screening test apparatus of the exemplary embodiment comprises: semiconductor integrated circuit 1 that includes CPUs 10-1 to 10-$n$ which are processors, instruction/data signal synchronization circuit 11 and trace comparison circuit 12; memory 2 that includes trace test program 21 and trace test data; and trace test apparatus 3.

In this exemplary embodiment, CPUs 10-1 to 10-$n$, semiconductor integrated circuit 1, memory 2, instruction/data signal synchronization circuit 11 and trace comparison circuit 12 may be separately packaged, have a circuit configuration within SoC (System-on-Chip), have a SiP (System-in-Package) configuration by means of separate chips, or a combination thereof.

CPUs 10-1 to 10-$n$ may be any program-operated processors such as a signal processing processor, a VLIW (Very Long Instruction Word) processor, a configurable processor and the like. The CPUs receive instructions through CPU instruction signals 101-1 to 101-$n$ and transmit data to and receive data from instruction/data signal synchronization circuit 11 through CPU data signals 102-1 to 102-$n$. The CPUs then provide the results of execution of the instructions to trace comparison circuit 12 through trace signals 102-1 to 102-$n$ as trace information. Instruction/data signal synchronization circuit 11 has the function to output instructions or data in synchronization with CPUs 10-1 to CPU 10-$n$. Trace comparison circuit 12 has the function to compare each of the corresponding item of trace information from CPUs 10-1 to CPU 10-$n$ with one another.

The functions of instruction/data signal synchronization circuit 11 and trace comparison circuit 12 may be implemented in software.

Instruction/data signal synchronization circuit 11 and trace comparison circuit 12 notify each other of errors through synchronization error signal 104. Instruction/data signal synchronization circuit 11 may control signal lines for clocks, reset, interruptions and the like that are used by the CPU.

Memory 2 may have a multi-chip configuration or a multi-bank configuration, provided that it can be implemented at a reasonable cost.

In the exemplary embodiment, trace test program 21 is made up of instructions that are executed by CPUs 10-1 to CPU 10-n. Trace test data 22 is made up of a data string that is referenced by trace test program 21.

Figure 4:
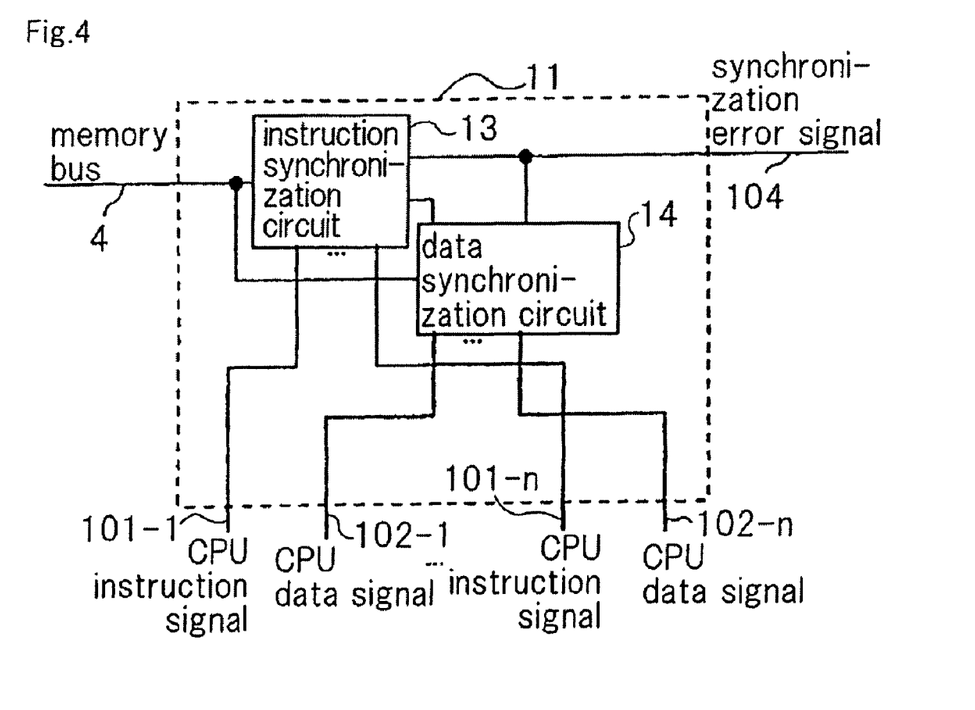
FIG. 4 is a view illustrating the configuration of an instruction/data signal synchronization circuit shown in FIG. 3.

FIG. 4 illustrates a first example of the configuration of instruction/data signal synchronization circuit 11. Instruction/data signal synchronization circuit 11 includes instruction synchronization circuit 13 for synchronization of instructions and data synchronization circuit 13 for synchronization of data. These circuits are connected with trace comparison circuit 12 via memory bus 4, with trace comparison circuit 12 through synchronization error signal 104, and with CPU 10-1 to CPU 10-n through CPU instruction signals 101-1 to 101-n and through CPU data signals 102-1 to 102-n.

Instructions to be read from memory 2 constitute trace test program 21 and data to be referenced is trace test data 22. Other instructions and data may naturally be referenced. For example, trace test program 22 may be a benchmark program, a program that is newly created to increase the coverage of the CPU test, or existing software assets such as client software and an OS (Operating System). Trace test program 22 may be a data section within the program, a file that the program references, or shared data.

Instruction synchronization circuit 13 waits instruction read requests from CPU instruction signals 101-1 to 101-n and, upon receipt of the instruction read requests from all the CPUs, reads instructions from memory 2 via memory bus 4. Instructions that have been read are supplied to CPUs 10-1 to CPU 10-n through CPU instruction signals 101-1 to 101-n in synchronization with each other. If the requests are received from some but not from all the CPUs, or if requests that are received are different, or even if requests are received from all the CPUs, if addresses that are referenced are different, then instruction synchronization circuit 13 informs trace comparison circuit 12 through synchronization error signal 104 accordingly. This makes it possible to supply the plurality of CPUs with instructions in synchronization with each other.

Data synchronization circuit 14 performs synchronizations in regard to reading/writing data. In regard to reading data, data synchronization circuit 14 waits data read requests through CPU data signals 102-1 to 102-n and upon receipt of the requests from all the CPUs, reads data from memory 2 via memory bus 4. Data that have been read are supplied to CPUs 10-1 to CPU 10-n through CPU data signals 102-1 to 102-n in synchronization with each other. If the requests are received from some but not from all the CPUs, or if the requests that are received are different, or even if the requests are received from all the CPUs, if addresses that are referenced are different, then data synchronization circuit 14 informs trace comparison circuit 12 through synchronization error signal 104 accordingly. In regard to writing data, data synchronization circuit 14 waits data write requests via CPU data signals 102-1 to 102-n and upon receipt of the requests from all the CPUs, writes data into memory 2 through memory bus 4. Then, completion signals are supplied to CPUs 10-1 to CPU 10-n through CPU data signals 102-1 to 102-n in synchronization with each other. If the requests are received from some but not from all the CPUs, or if the requests that are received are different, or even if the requests are received from all the CPUs, if addresses or addresses that are referenced are different, then data synchronization circuit 14 informs trace comparison circuit 12 through synchronization error signal 104 accordingly. This makes it possible to supply the plurality of CPUs with data in synchronization with each other.

The reason that synchronization of instructions and synchronization of data are performed is to bring the tracings of CPU operations into complete agreement at each cycle among the CPUs. If trace comparison circuit 12 has a circuit for correcting the lag of a cycle, such as a buffer, complete synchronization is not required.

Trace test apparatus 3 receives through trace test apparatus signal 200 the output from semiconductor integrated circuit 1 that is to be screened, such as the presence or absence of the occurrence of inconsistency in the CPU screen-test, and when inconsistency occurs, information of the appropriate CPU. Then, trace test apparatus 3 controls the halt, continuation, resuming and etc. of the screening test depending on the content of the output.

Figure 5:
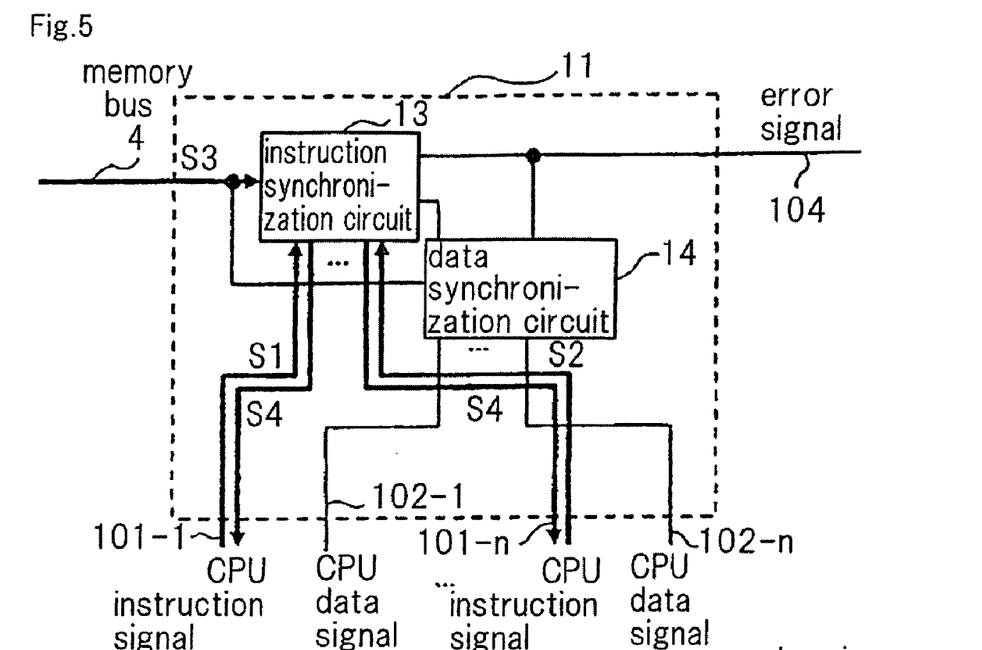
FIG. 5 is an explanatory view of an example of the operation of the instruction/data signal synchronization circuit shown in FIG. 3.

FIG. 5 is an explanatory view of the operation of instruction/data signal synchronization circuit 11 shown in FIG. 4. In FIG. 5, the symbol at the side of an arrow that consists of "S" and a number represents a step number. Herein, it is assumed that CPUs 10-1 to CPU 10-n employ a Harvard scheme to separate an instruction bus and a data bus from each other, which is used in a typical CPU. Therefore, both instructions and data need to be synchronized with each other.

CPU 10-1 outputs an instruction read request through CPU instruction signal 101-1 (step S1). CPU 10-2 outputs an instruction read request through CPU instruction signal 101-2 (step S2). Upon receipt of all of the instruction read requests, instruction synchronization circuit 13 reads an instruction from memory 2 through memory bus 4 (step S3). Instruction synchronization circuit 110 supplies the read instruction to CPU 10-1 to CPU 10-n through CPU instruction signals 101-1 to 101-n.

Figure 6:
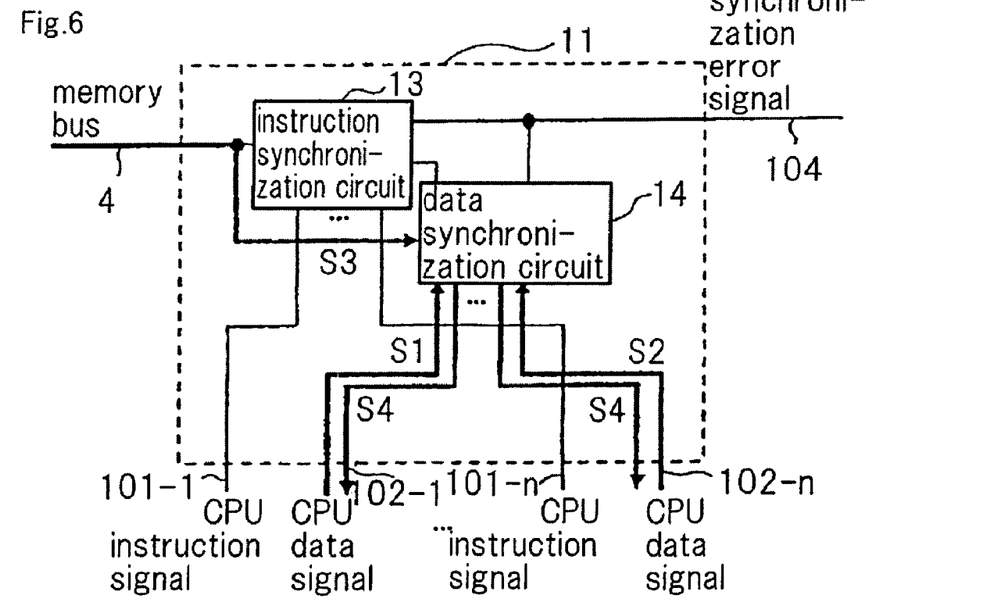
FIG. 6 is an explanatory view of another example of the operation of the instruction/data signal synchronization circuit shown in FIG. 3.

FIG. 6 is an explanatory view of another example of the operation of instruction/data signal synchronization circuit 11 shown in FIG. 2. In FIG. 6, the symbol at the side of an arrow that consists of "S" and a number represents a step number.

CPU 10-1 outputs a data read request through CPU data signal 102-1 (step S1). CPU 10-n outputs an instruction read request through CPU data signal 102-n (step S2). Upon receipt of all of the data read requests, data synchronization circuit 14 reads data from memory 2 through memory bus 4 (step S3). Data synchronization circuit 14 supplies the read data to CPUs 10-1 to CPU 10-n through CPU data signals 102-1 to 102-n in synchronization with each other (step S4).

Figure 7:
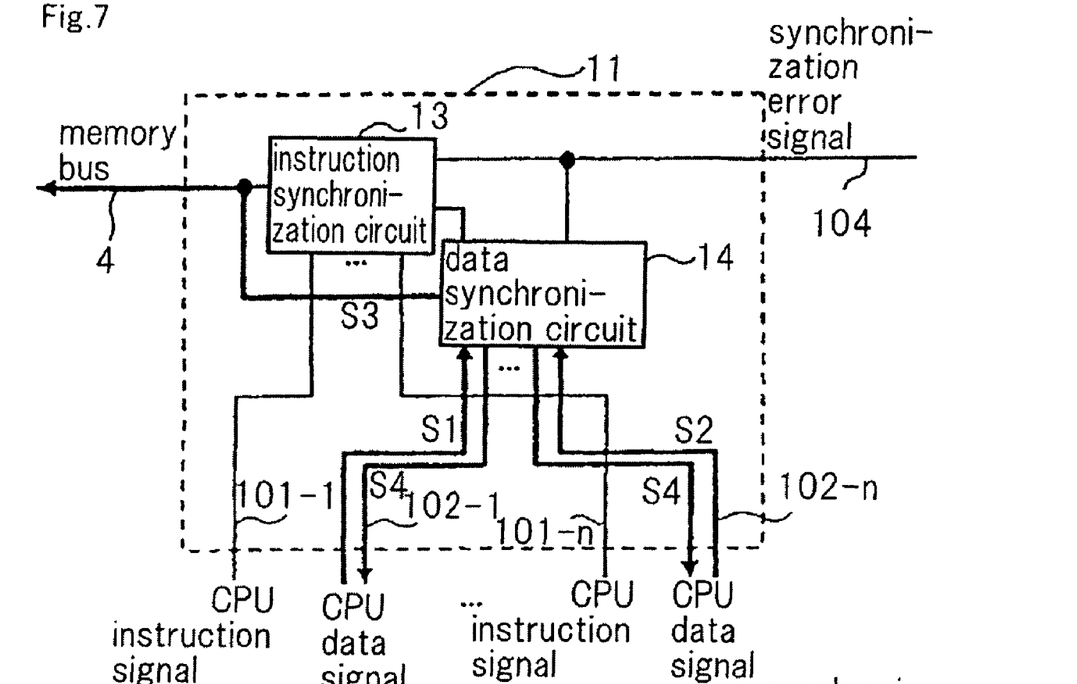
FIG. 7 is an explanatory view of yet another example of the operation of the instruction/data signal synchronization circuit shown in FIG. 3.

FIG. 7 is an explanatory view of another example of the operation of instruction/data signal synchronization circuit 11 shown in FIG. 4. In FIG. 7, the symbol at the side of an arrow that consists of "S" and a number represents a step number.

Herein, it is assumed that CPUs 10-1 to CPU 10-n employ a Harvard scheme to separate an instruction bus and a data bus from one another, which is used in a typical CPU. Therefore, both instructions and data need to be synchronized with each other.

CPU 10-1 outputs a data write request and data through CPU data signal 102-1 (step S1). CPU 10-n outputs a data write request and data through CPU data signal 102-n (step S2). Upon receipt of all of the data write requests, data synchronization circuit 14 writes the data into memory 2 through memory bus 4 (step S3). After the completion of writing data into memory 2, data synchronization circuit 14 informs CPUs 10-1 to CPU 10-*n* of the completion through CPU data signals 102-1 to 102-*n* (step S4).

Figure 8:
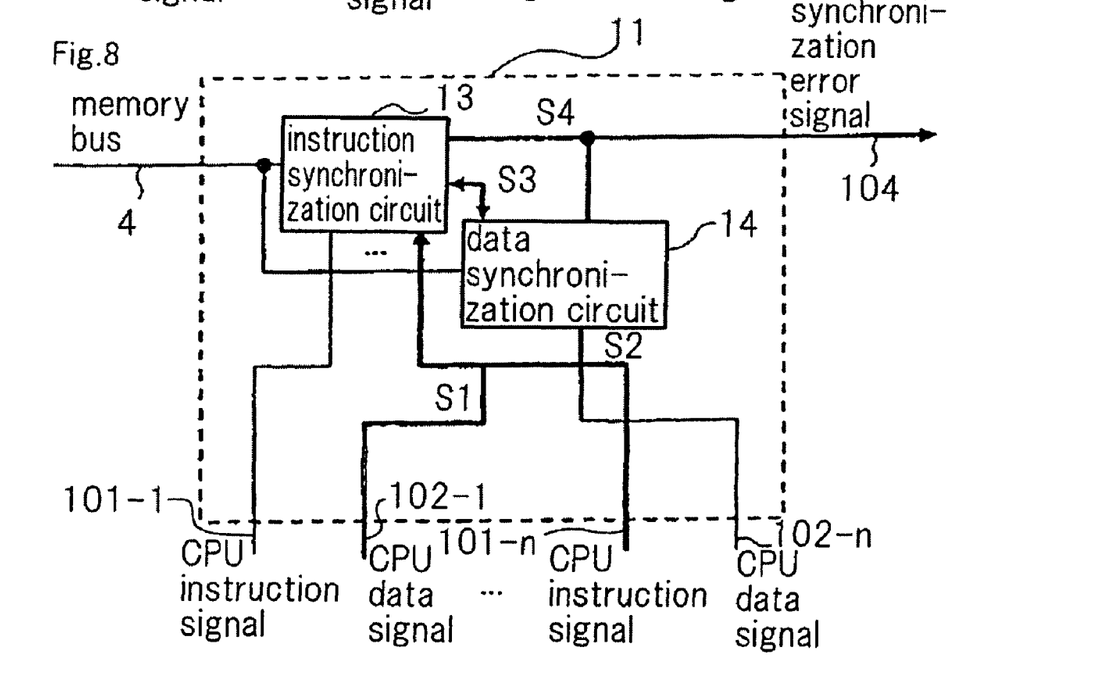
FIG. 8 is an explanatory view of still yet another example of the operation of the instruction/data signal synchronization circuit shown in FIG. 3.

FIG. 8 is an explanatory view of another example of the operation of instruction/data signal synchronization circuit 11 shown in FIG. 4. In FIG. 8, the symbol at the side of an arrow that consists of "S" and a number represents a step number.

Herein, it is assumed that CPUs 10-1 to CPU 10-*n* employ a Harvard scheme to separate an instruction bus and a data bus from one another, which is used in a typical CPU. Therefore, both instructions and data need to be synchronized with each other.

CPU 10-1 outputs a data write request and data through CPU data signal 102-1 (step S1). CPU 10-*n* outputs an instruction read request through CPU instruction signal 101-*n* (step S2). Instruction synchronization circuit 13 and data synchronization circuit 14 monitor each other's state of receipt of a request and recognize that each other's requests do not coincide with each other and that different requests are being received (step S3). Instruction synchronization circuit 13 and data synchronization circuit 14 inform trace comparison circuit 12 of the error information through synchronization error signal 104.

Figure 9:
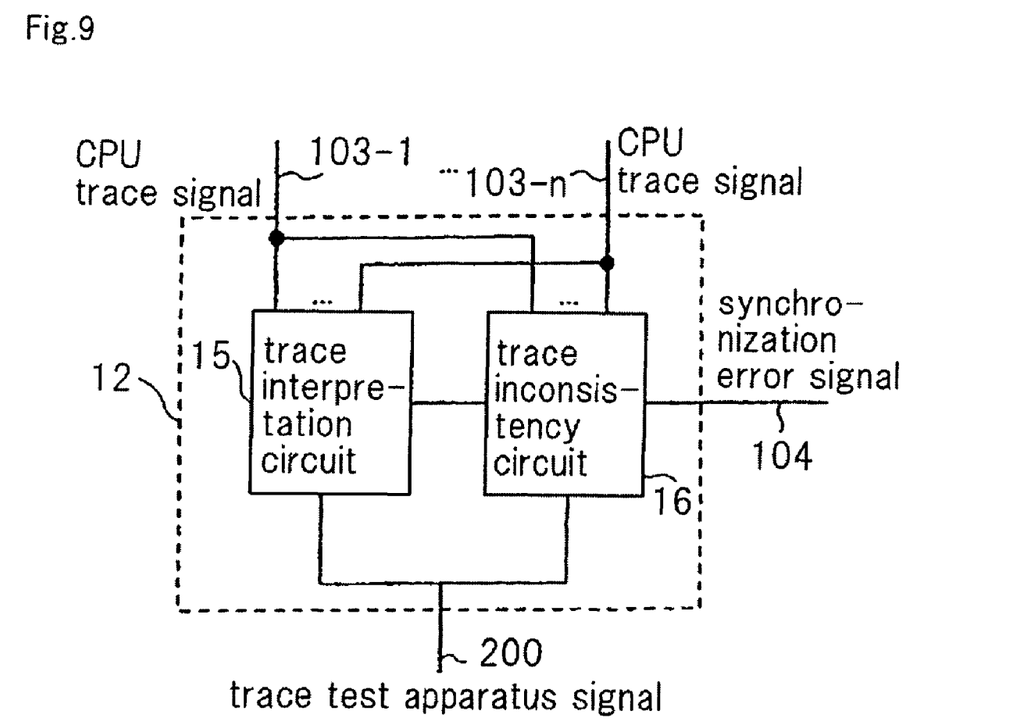
FIG. 9 is a view illustrating the configuration of a trace comparison circuit shown in FIG. 3.

FIG. 9 is a view illustrating an example of the configuration of trace comparison circuit 12. As shown in FIG. 9, trace comparison circuit 12 includes trace interpretation circuit 15 and trace inconsistency determination circuit 16. Trace interpretation circuit 15 and trace inconsistency determination circuit 16 are connected through trace test apparatus signal 200 to trace test apparatus 3 to which the result of comparison is output, are connected to instruction/data synchronization circuit 11 through synchronization error signal 104, and are connected to CPUs 10-1 to CPU 10-*n* through CPU trace signals 103-1~103-*n*. Trace inconsistency determination circuit 16 determines whether or not trace information coincide with each other. Trace interpretation circuit 15 and trace inconsistency determination circuit 16 each have a signal (not shown) that is needed for the mutual coordinated operation.

Trace interpretation circuit 15 interprets trace information from CPU trace signal 103-1 and converts the information into a string of instructions that are actually executed. This conversion can be handled by an existing technique to convert trace information into a string of instructions that has been utilized in debugging software for a single CPU. In the following, in order to determine which instruction has caused an error, a comparison between strings of instructions is premised. However, if just a determination of inconsistency is desired, trace information itself may be compared.

Next, the converted string of instructions is output, based on the notice from trace inconsistency determination circuit 16, to trace test apparatus 3 as trace test apparatus signal 200. Trace interpretation circuit 15 may have a buffer therein for storing the string of instructions. Trace interpretation circuit 15 may output not only a string of instructions from CPUs that exhibit inconsistency, but also a string of instructions from CPUs that exhibit consistency for comparison. This makes it possible to diagnose which CPU has caused malfunction and to diagnose the point of time when the malfunction occurred, following determination of inconsistency. From the point of view of conducting a screening test, trace interpretation circuit 15 may be optional.

Trace inconsistency determination circuit 16 compares trace information from CPU trace signals 103-1~103-*n* at a high speed using a comparator to determine whether or not they coincide with each other. Trace inconsistency determination circuit 16 can make a comparison at an actual frequency which is supplied to the CPUs. When inconsistency is detested, trace inconsistency determination circuit 16 informs trace interpretation circuit 15 of the CPU number of a CPU that has caused inconsistency. Similarly, when a notice is received through synchronization error signal 104, trace inconsistency determination circuit 16 informs trace interpretation circuit 15 of the content of the notice. Furthermore, trace inconsistency determination circuit 16 outputs information concerning a CPU that has caused inconsistency to trace test apparatus 3 through trace test apparatus signal 200. This makes it possible to diagnoses which CPU has caused the malfunction.

Trace comparison circuit 12 may be provided with a circuit such as a buffer to avoid the lag of each cycle, thereby avoiding the delay of the supply of synchronization signals due to the lag at instruction/data signal synchronization circuit 11. Alternatively, strings of trace may be compared as a sequence using the buffer.

Figure 10:
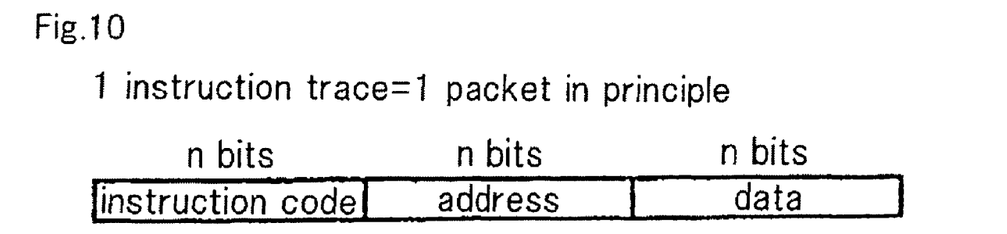
FIG. 10 is a view illustrating the configuration of trace information in the embodiment.

FIG. 10 illustrates an example of the configuration of the trace information in the exemplary embodiment. Here, trace information is such that one item of instruction trace information is, in principle, represented by one packet. For example, one packet contains n bits that represent an instruction code itself, n bits that represent an address itself and n bits that represent data itself, regarding an instruction that is executed. When a plurality of memory accesses are executed by one instruction, one packet is output for each memory access.

Figure 11:
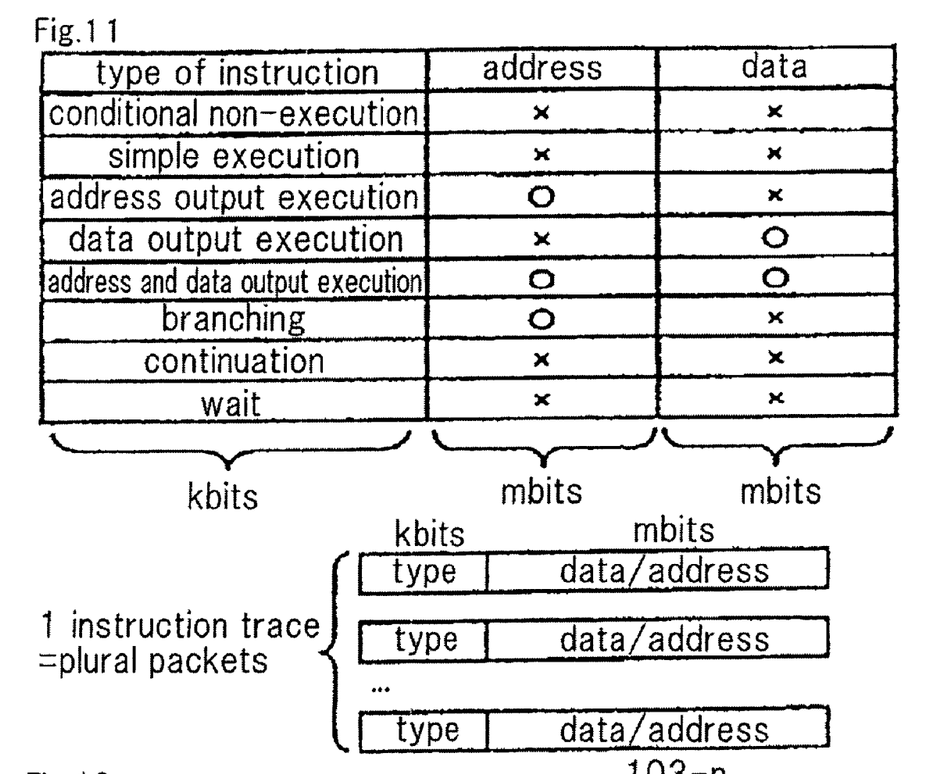
FIG. 11 is a view illustrating another configuration of trace information in the embodiment.

FIG. 11 illustrates another example of the configuration of the trace information in the exemplary embodiment. In this example, unlike the example shown in FIG. 10, one item of instruction trace information is represented by a plurality of packets, resulting in the reduction in the hardware cost. For example, one packet contains k bits that represent the type, and m bits that represent part of the address and the data, regarding an execution that is executed. Here, the type of trace comprises: "conditional non-execution" that represents that the executed instruction was not conditionally executed; "simple execution" representative of a normal execution; "address output execution" that represents that an address output was carried out; "data output execution" that represents that a data output was carried out; "address and data output execution" that represents that an address output and data output were carried out; and "branching" that represents that branching was carried out. The type of trace further comprises: "continuation" that represents continuation information of the prior packet; and "wait" that represents that the execution of the instruction is in a wait status.

Figure 12:
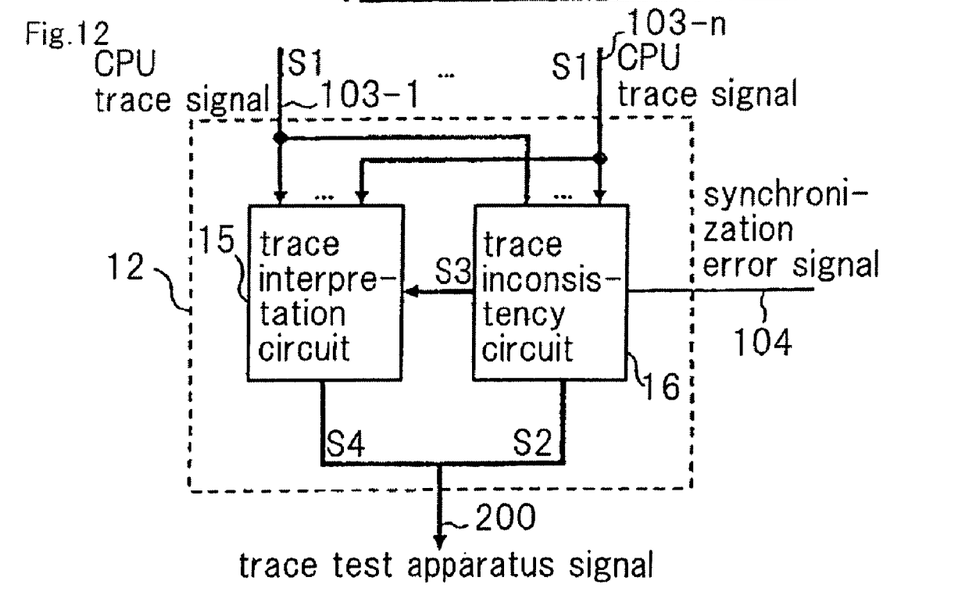
FIG. 12 is a view illustrating the operation of the trace comparison circuit.

FIG. 12 is an explanatory view of an example of the operation of trace comparison circuit 12 shown in FIG. 9. In FIG. 12, the symbol at the side of an arrow that consists of "S" and a number represents a step number.

Trace information are supplied to trace comparison circuit 12 from CPUs 10-1 to CPU 10-*n* through CPU trace signals 103-1~103-*n* (step S1). Trace inconsistency determination circuit 16 detects the inconsistency among items of trace information that are supplied in step S1, and informs trace test apparatus 2 of the CPU number of the CPU(s) that has (have) caused inconsistency, through trace testing apparatus signal 200. Trace inconsistency determination circuit 16 also informs trace interpretation circuit 15 of the CPU number(s) of the CPU(s) that has (have) caused inconsistency. Trace interpretation circuit 15 outputs trace information regarding all the CPUs that have caused inconsistency, to trace test apparatus 3 through trace test apparatus signal 200.

Figure 13:
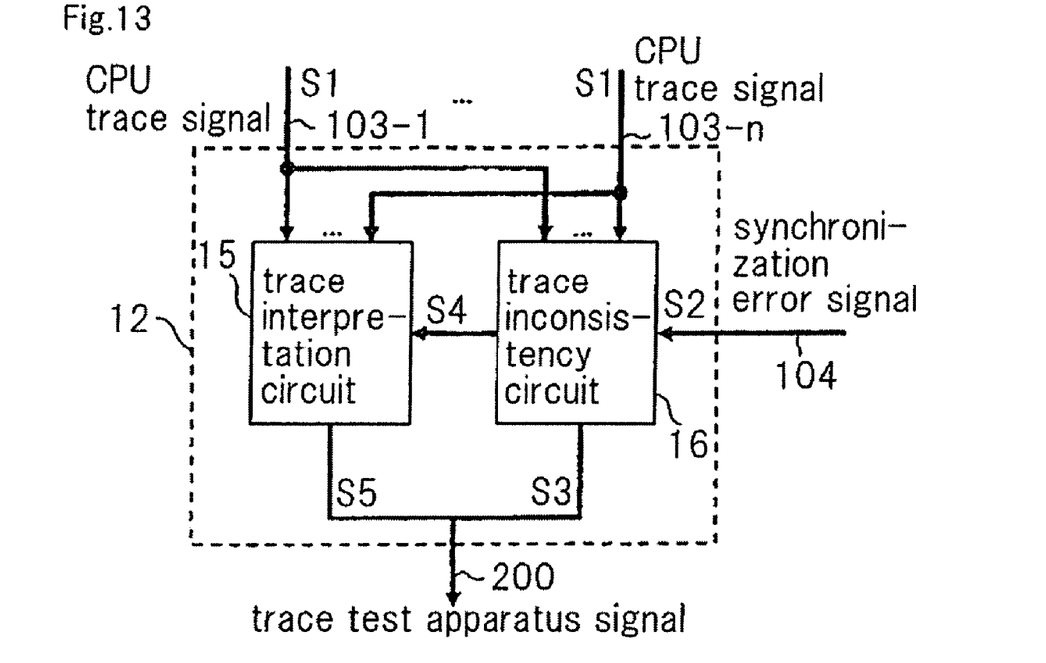
FIG. 13 is a view illustrating another operation of the trace comparison circuit.

FIG. 13 is an explanatory view of another example of the operation of trace comparison circuit 12 shown in FIG. 9. In FIG. 13, the symbol at the side of an arrow that consists of "S" and a number represents a step number.

Trace information are supplied to trace inconsistency determination circuit 16 from CPUs 10-1 to CPU 10-*n* through CPU trace signals 103-1~103-*n* (step S1). Trace inconsistency determination circuit 16 is informed of CPU information of the CPU(s) that has (have) caused inconsistency, through synchronization error signal 104 (step S2). Trace inconsistency determination circuit 16 informs trace test apparatus 3 of the CPU number(s) of the CPU(s) that has (have) caused inconsistency, through trace test apparatus signal 200 (step S3). Trace inconsistency determination circuit 16 informs trace interpretation circuit 15 of the CPU number(s) of the CPU(s) that has (have) caused inconsistency (step S4). Trace interpretation circuit 15 outputs trace information regarding all the CPUs that have caused inconsistency, to trace test apparatus 3 through trace test apparatus signal 200.

Figure 14:
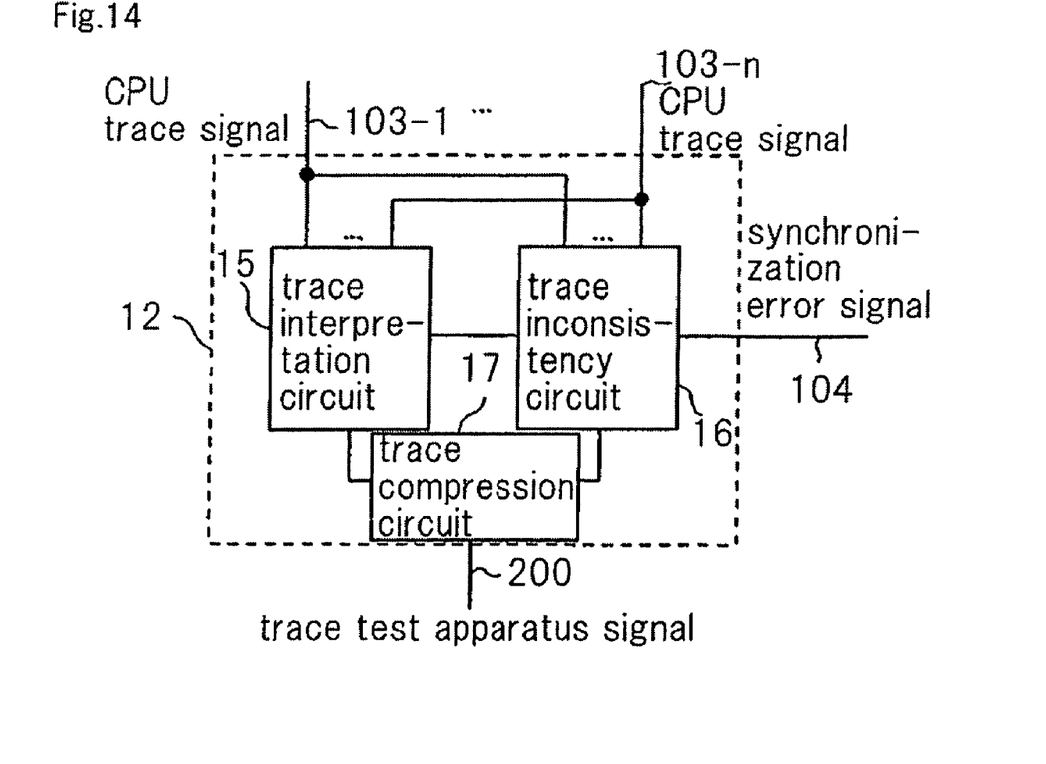
FIG. 14 is a view illustrating a modification of the configuration of the trace comparison circuit.

FIG. 14 is a view illustrating another example of the configuration of trace comparison circuit 12.

As shown in FIG. 14, trace comparison circuit 12 includes trace interpretation circuit 15 and trace compression circuit 17. Trace compression circuit 17 compresses the information of the CPU(s) that has (have) caused inconsistency, and the details of instruction execution information that are output from the CPU(s) that has (have) caused inconsistency. In general, providing the output of trace comparison circuit 12 to trace test apparatus 3 at the outside requires an extremely high communication performance. Trace compression circuit 17 makes it possible to obviate the need of such a high communication performance.

The processing operation of the semiconductor integrated circuit screening test apparatus according to each of the above exemplary embodiments may be carried out by recording a program for performing the functions of the processing operation in a computer-readable recording medium, and by reading the program thus recorded into a computer. The computer-readable recording medium may refer to a recording medium such as a flexible disk, a CD-ROM, or the like, or a recording medium such as a hard disk drive incorporated in a computer system. The computer-readable recording medium may also refer to a medium for dynamically holding a computer program for a short period of time, e.g., a transmission medium or a transmission wave, for use in applications for transmitting the program through the Internet, or a medium for holding the program for a certain period of time, e.g., a volatile memory in a computer system which operates as a server in such application.

This application is the National Phase of PCT/JP2007/070255, filed Oct. 17, 2007, which is based upon and claims the benefit of priority from Japanese patent application No. 2006-299091 filed on Nov. 2, 2006, the disclosure of which is incorporated herein in its entirety by reference.

While preferred exemplary embodiments of the present invention have been described using specific terms, such description is for illustrative purposes only, and it is to be understood that changes and variations may be made without departing from the spirit or scope of the following claims.

The invention claimed is:

1. An apparatus for performing a screening test of a semiconductor integrated circuit comprising a plurality of processors each having an output signal for instruction execution information, wherein said processors are programmatically operable at a first synchronization clock, said apparatus comprising:

instruction/data signal synchronization means for synchronizing the supplying of instructions to said respective processors at said first synchronization clock of said processors and for synchronizing the supplying of data to said respective processors at a second synchronization clock of said processors; and trace comparison means for comparing instruction execution information at a third synchronization clock from said instruction/data signal synchronization means of said processors, which information is output from the respective processors to determine whether or not any of said processors has output different instruction execution information.

2. The apparatus for performing a screening test of a semiconductor integrated circuit according to claim 1, wherein said trace comparison means outputs the result of determination to a trace test apparatus.

3. The apparatus for performing a screening test of a semiconductor integrated circuit according to claim 2, wherein said instruction/data signal synchronization means includes instruction synchronization means for synchronizing the supplying of instructions to said respective processors at each operating cycle of said processors and data synchronization means for synchronizing the supplying of data to said respective processors at each operating cycle of said processors.

4. The apparatus for performing a screening test of a semiconductor integrated circuit according to claim 2, wherein when request information are received from some but not from all said processors or when said request information are not identical, said instruction synchronization means and said data synchronization means inform said trace comparison means accordingly through a synchronization error signal.

5. The apparatus for performing a screening test of a semiconductor integrated circuit according to claim 2, wherein said trace comparison means includes inconsistency determination means for outputting information of a processor or processors that has (have) caused inconsistency, as a result of a comparison of the output signals of the instruction execution information of said processors.

6. The apparatus for performing a screening test of a semiconductor integrated circuit according to claim 5, wherein said inconsistency determination means also refers to the inconsistency information from said instruction/data synchronization means.

7. The apparatus for performing a screening test of a semiconductor integrated circuit according to claim 2, wherein said trace comparison means includes trace inconsistency determination means for comparing the output signals of the instruction execution information of said processors; and trace interpretation means for interpreting the instruction execution information of said processors, and when inconsistency is notified by said trace inconsistency determination means, for outputting information of a processor or processors that has (have) caused inconsistency, and the details of the instruction execution information of a processor or processors that has (have) caused inconsistency.

8. The apparatus for performing a screening test of a semiconductor integrated circuit according to claim 7 further comprising trace compression means for compressing information of a processor or processors that has (have) caused inconsistency, and for compressing the details of the instruction execution information of a processor or processors that has (have) caused inconsistency, both being output from said trace interpretation means.

9. The apparatus for performing a screening test of a semiconductor integrated circuit according to claim 1, wherein said instruction/data signal synchronization means includes instruction synchronization means for synchronizing the supplying of instructions to said respective processors at each operating cycle of said processors and data synchronization means for synchronizing the supplying of data to said respective processors at each operating cycle of said processors.

10. The apparatus for performing a screening test of a semiconductor integrated circuit according to claim 1, wherein when request information are received from some but not from all said processors or when said request information are not identical, said instruction synchronization means and said data synchronization means inform said trace comparison means accordingly through a synchronization error signal.

11. The apparatus for performing a screening test of a semiconductor integrated circuit according to claim 1, wherein said trace comparison means includes inconsistency determination means for outputting information of a processor or processors that has (have) caused inconsistency, as a result of a comparison of the output signals of the instruction execution information of said processors.

12. The apparatus for performing a screening test of a semiconductor integrated circuit according to claim 11, wherein said inconsistency determination means also refers to the inconsistency information from said instruction/data synchronization means.

13. The apparatus for performing a screening test of a semiconductor integrated circuit according to claim 1, wherein said trace comparison means includes trace inconsistency determination means for comparing the output signals of the instruction execution information of said processors; and trace interpretation means for interpreting the instruction execution information of said processors, and when inconsistency is notified by said trace inconsistency determination means, for outputting information of a processor or processors that has (have) caused inconsistency, and the details of the instruction execution information of a processor or processors that has (have) caused inconsistency.

14. The apparatus for performing a screening test of a semiconductor integrated circuit according to claim 13 further comprising trace compression means for compressing information of a processor or processors that has (have) caused inconsistency, and for compressing the details of the instruction execution information of a processor or processors that has (have) caused inconsistency, both being output from said trace interpretation means.

15. A method of performing a screening test of a semiconductor integrated circuit comprising a plurality of processors each having an output signal for instruction execution information, wherein said processors are programmatically operable at a first synchronization clock, said method comprising:
upon receipt of all instruction read requests from said processors, reading instructions from a memory, and outputting the instructions to said respective processors at said first synchronization clock of said processors in synchronization with each other;
upon receipt of all data read requests from said processors, reading data from a memory, and outputting the data to said respective processors at a second synchronization clock of said processors in synchronization with each other; and
comparing instruction execution information at a third synchronization clock of said processors, which information is output from the respective processors to determine whether or not any of said processors has output different instruction execution information.

16. The method of performing a screening test of a semiconductor integrated circuit, according to claim 15, wherein said determination includes outputting the information of a processor or processors that has (have) caused inconsistency, as a result of the comparison of the instruction execution information output from said processors.

17. The method of performing a screening test of a semiconductor integrated circuit according to claim 15, wherein said determination includes:
comparing the instruction execution information output from said processors at each operating cycle of said processors;
interpreting the instruction execution information output from said processors at each operating cycle of said processors; and
when inconsistency is notified, outputting information of a processor or processors that has (have) caused inconsistency, and the details of the instruction execution information of a processor or processors that has (have) caused inconsistency.

18. The method of performing a screening test of a semiconductor integrated circuit according to claim 17 further comprising compressing information of a processor or processors that has (have) caused inconsistency, and the details of the instruction execution information of a processor or processors that has (have) caused inconsistency.

19. A computer program product for causing a computer to perform a screening test of a semiconductor integrated circuit comprising a plurality of processors each having an output signal for instruction execution information, wherein said processors are programmatically operable at a first synchronization clock, said computer program product comprising:
software instructions for causing said computer to perform a predetermined procedure; and
a computer-readable medium for recording therein said software instructions, said predetermined procedure including the steps of:
upon receipt of all instruction read requests from said processors, reading instructions from a memory, and outputting the instructions to said respective processors at said first synchronization clock of said processors in synchronization with each other;
upon receipt of all data read requests from said processors, reading data from a memory, and outputting the data to said respective processors at a second synchronization clock of said processors in synchronization with each other; and
comparing instruction execution information at a third synchronization clock of said processors, which information is output from the respective processors at each operating cycle of said processors to determine whether or not any of said processors has output different instruction execution information.

* * * * *